(12) United States Patent
Hofmann et al.

(10) Patent No.: US 11,009,077 B2
(45) Date of Patent: May 18, 2021

(54) SEALED BEARING MODULE

(71) Applicant: Aktiebolaget SKF, Gothenburg (SE)

(72) Inventors: Matthias Hofmann, Schweinfurt (DE); Michael Baumann, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/455,880

(22) Filed: Jun. 28, 2019

(65) Prior Publication Data

US 2020/0011287 A1 Jan. 9, 2020

(30) Foreign Application Priority Data

Jul. 4, 2018 (DE) .......................... 102018211020.4

(51) Int. Cl.
*F16C 33/78* (2006.01)
*F16C 33/60* (2006.01)
(Continued)

(52) U.S. Cl.
CPC ........ *F16C 33/7896* (2013.01); *F03B 11/006* (2013.01); *F03B 11/06* (2013.01); *F16C 33/60* (2013.01); *F16C 33/7886* (2013.01); *F16C 35/045* (2013.01); *F02C 7/28* (2013.01); *F03B 13/22* (2013.01); *F05B 2240/50* (2013.01); (Continued)

(58) Field of Classification Search
CPC .............. F16C 33/7886; F16C 33/7896; F16C 35/045; F16C 35/60
See application file for complete search history.

(56) References Cited

U.S. PATENT DOCUMENTS 3,434,727 A * 3/1969 Kollenberger ....... F16J 15/3268
  277/577
6,866,423 B2 * 3/2005 Faltus ..................... F16C 23/10
  384/559

(Continued)

FOREIGN PATENT DOCUMENTS

DE 102009014923 A1 9/2010
DE 102010063687 A1 6/2012
(Continued)

OTHER PUBLICATIONS

Communication from the European Patent Office dated Dec. 4, 2019 in related EP application No. 19182591.8, including European Search Report and European Search Opinion.

*Primary Examiner* — James Pilkington
(74) *Attorney, Agent, or Firm* — J-Tek Law PLLC; Scott T. Wakeman; Mark A. Ussai

(57) ABSTRACT

A sealed bearing module for a tidal turbine that has a rotor having rotor blades disposed on a rotor hub and a rotor shaft carrying the rotor for transmitting a drive torque from the rotor hub to a transmission or a generator in a nacelle which nacelle has a housing. The bearing module includes a first bearing ring and a second bearing ring, the first bearing ring is a split bearing ring having a first bearing ring part and a second bearing ring part, the second bearing ring has at least one axially extending bore for attaching the second bearing ring directly to the nacelle housing, the first bearing ring is configured to be connected to the rotor shaft and/or to the rotor hub, and the split bearing ring is preloaded by a preload element.

19 Claims, 3 Drawing Sheets

(51) Int. Cl.
*F03B 11/06* (2006.01)
*F03B 11/00* (2006.01)
*F16C 35/04* (2006.01)
*F02C 7/28* (2006.01)
*F03B 13/22* (2006.01)

(52) U.S. Cl.
CPC ....... *F05B 2240/57* (2013.01); *F16C 2360/00* (2013.01)

(56) References Cited

U.S. PATENT DOCUMENTS

| | | | |
|---|---|---|---|
| 8,535,009 B2* | 9/2013 | Hofmann | F16C 19/386 |
| | | | 416/174 |
| 9,334,901 B2* | 5/2016 | Schroppel | F03B 11/006 |
| 10,458,469 B2* | 10/2019 | Zang | F16C 33/60 |
| 2010/0247295 A1 | 9/2010 | Hofmann | |
| 2014/0010655 A1 | 1/2014 | Hofmann | |
| 2016/0126807 A1* | 5/2016 | Angelis | F16C 19/386 |
| | | | 310/67 R |
| 2019/0242435 A1* | 8/2019 | Baumann | F16C 33/7823 |

FOREIGN PATENT DOCUMENTS

| | | |
|---|---|---|
| DE | 102014205816 A1 | 10/2015 |
| EP | 2655879 B1 | 12/2015 |
| EP | 2993123 A1 | 3/2016 |
| JP | 2011220465 A | 11/2011 |

* cited by examiner

SEALED BEARING MODULE

CROSS-REFERENCE

This application claims priority to German patent application no. 10 2018 211 020.4 filed on Jul. 4, 2018, the contents of which are fully incorporated herein by reference.

TECHNOLOGICAL FIELD

The present disclosure is directed to a sealed bearing module of a tidal turbine including a rotor having rotor blades disposed on a rotor hub and a nacelle carrying the rotor, for transmitting a drive torque from the rotor hub to a transmission or generator in the nacelle.

BACKGROUND

In tidal turbines the rotating rotor hub must be supported with a following rotor shaft. To date bearing assemblies are supplied as individual parts and installed and assembled on-site in the tidal turbine. The requirements for such bearing assemblies with respect to reliability, service life, or reduced maintenance intensity are high since such tidal turbines themselves have a long service life. In order to fulfill these requirements, it is desirable to use as few components as possible in order to thus reduce a possible failure of the components.

SUMMARY

It is therefore an aspect of the present disclosure to provide a bearing assembly by which the number of components required in a tidal turbine can be reduced.

This object is achieved by a sealed bearing module according to the disclosure.

The sealed bearing module can be used in a tidal turbine that includes a rotor including rotor blades disposed on a rotor hub, and a rotor shaft carrying the rotor. Here the rotor is attached to a nacelle. In particular such a bearing module can be used to transmit a drive torque from the rotor hub to a transmission or generator in the nacelle. The nacelle includes a housing, and the generator and the generator shaft are disposed in the housing. The rotor hub can be directly connected, for example, via a rotor shaft, to an input shaft of the transmission, or represent the rotor shaft. An output shaft of the transmission is in turn connected to the generator or the generator shaft. Alternatively the rotor hub can be directly connected to the generator without a transmission connected therebetween.

In order to transmit the drive torque from the rotor hub to the transmission or generator, the bearing module includes an inner ring and an outer ring, and one of these bearing rings is configured as a split bearing ring.

In order to reduce the number of components required, the disclosed bearing module includes only one bearing. Furthermore the bearing module is provided as a complete system and can be installed in the tidal turbine in the already assembled state. The installation is thus substantially simplified.

One of the bearing rings of the bearing module includes axially extending bores for attaching the bearing ring directly to the nacelle housing. The bores can be distributed circumferentially about the ring. The bores are preferably uniformly distributed. The other bearing ring is connected to the rotor shaft and/or the rotor hub. A very compact bearing module can be provided by the arrangement of the two bearing rings, whereby the length of the generator shaft can be reduced. This also leads to a more compact and lower weight design of the nacelle in which the rotor shaft is disposed, and thereby also to lower costs.

The bearing ring that is configured as a split bearing ring is preloaded by a preload element. The split bearing ring can be held together by the use of the preload element.

Here the bearing module can be inserted as a whole from the rotor side into the tidal turbine and installed therein. In this way a plug-and-play solution is provided that can be easily integrated into the tidal turbine. This reduces possible errors in installation. Furthermore, necessary tests, such as, for example, for seal-tightness, can already have been performed during manufacturing.

The bearing can be a roller bearing, in particular a tapered roller bearing. The tapered roller bearing is preferably a double row tapered roller bearing. The rollers of the bearing can be separated from each other by a cage. If the tapered roller bearing is configured in a back-to-back arrangement, the split bearing ring is the inner ring. If the tapered roller bearing is instead configured in a face-to-face arrangement, the outer ring is configured as a split bearing ring.

The first and the second bearing ring part of the split bearing ring can include a through-bore through which the preload element, in particular a threaded rod, is passable-through in order to preload the bearing ring parts against each other. The threaded rod can include an end element on both ends in order to allow for a stepless preload via the tightening torque of the nuts. The end element can be, for example, a nut or a head of a bolt. The threaded rod can be supported by one end, or end element, on the first bearing ring part, and by the other on the second bearing ring part. In this case the rotor hub can be directly connected to the first bearing ring part and the transmission input shaft or generator shaft directly connected to the second bearing ring part. Here the transmission of the drive torque is effected via the split bearing ring. A separate rotor shaft can thereby be omitted.

Alternatively an intermediate element on which the threaded rod is supported can be disposed between the rotor hub and the first bearing ring part. In this case the transmission of the drive torque from the rotor hub is effected via the intermediate element and the split bearing ring to the transmission or generator shaft.

In one alternative embodiment the preload element can be a clamping ring, wherein the clamping ring includes a force-imparting element in order to exert force on the second bearing ring part. Here the rotor shaft can include a support element on which the first bearing ring part is supported. The support element can be configured integrally with the rotor shaft, for example, in the form of a projection. The force-imparting element can be configured, for example, as a shoulder of the clamping ring that abuts on the second bearing ring part and exerts a force on the second bearing ring part parallel to the longitudinal axis of the rotor shaft or the generator shaft.

In order to fix the position of the clamping ring, the clamping ring can furthermore be supported on the rotor shaft. In particular the clamping ring can include a bore in order to connect the clamping ring to the rotor shaft.

The bearing module can furthermore include a seal system for sealing the bearing module. The seal system serves on the one hand to seal the bearing against sea water and on the other to hold lubricant in the bearing. The seal system can therefore preferably be disposed between the outer ring/inner ring and the rotor since sea water can penetrate from the side of the rotor.

In order to make possible a simple exchange of the seal system, it is detachably disposed directly on the outer ring and inner ring or the rotor shaft. In this way the seal system can be removed and exchanged even after installation of the bearing module in the tidal turbine. Here the seal system is preferably disposed on a side of the outer ring toward the rotor.

The seal system can include a slip surface. This can be configured integrally with the rotor shaft or on a spacer ring that is disposed on the rotor shaft. Alternatively the slip surface can be configured integrally with the above-described intermediate element or on a spacer ring that is disposed on the intermediate element.

The slip surface can be manufactured from stainless steel, in particular chromium steel. In order to seal the bearing module, a seal can be provided between the spacer ring and the rotor shaft or the intermediate element. This seal can be realized, for example, by O-rings that are disposed between the rotor shaft or the intermediate element and the spacer ring.

The seal system preferably includes a plurality of seal units. Here each seal unit is comprised of a seal carrier ring and a seal element including a seal lip. The seal elements are disposed on the slip surface, wherein the respective seal lip sealingly slips on the slip surface, and each are carried by a seal carrier ring. The individual seal carrier rings are disposed adjacent to each other in the axial direction with respect to the slip surface. Here two seal carrier rings can always be attached to each other using attachment means, for example, using a screw connection. Here the attachment means can be offset circumferentially in axial orientation with respect to one another.

The seal lips can be manufactured from a rubber or polyurethane material. The material used preferably includes an intrinsic lubrication and is suitable for use in seawater. With seal lips made of a polyurethane material (plastic) the intrinsic lubrication is effected by solid lubricants (carbon) that are embedded in the plastic in the manufacturing process.

The seal carrier rings can be comprised of stainless steel, structural steel, or cast iron. In addition the surface of the seal carrier rings can be protected by a corrosion protection layer. The corrosion protection layer can include, for example, zinc and can be applied as a lacquer or as a galvanized layer. With the use of not-inherently-corrosion-protected steels a sacrificial anode can be used in order to avoid or at least delay corrosion.

The seal system can include a seal unit toward the outer ring, which seal unit is disposed directly on the outer ring. In comparison to the other seal units, this seal unit can be configured larger in the radial direction and correspond in its dimensions to the outer ring.

According to one embodiment the seal system includes a seal unit that acts as a seal cover for the axially opposite side of the seal system. The seal cover closes the seal system with respect to the rotor. The other seal units are disposed on the outer ring between the seal cover and the seal unit.

Because of this arrangement in which the seal units are disposed axially adjacent to each other, the seal units can be exchanged in a simple manner. For this purpose only the seal cover need be removed and subsequently the first seal unit can be exchanged. If more than one seal unit is to be exchanged, the first seal unit and further seal units following the first seal unit can be exchanged.

If the seal carrier rings or the seal lips have different widths, then with an exchange of a plurality of seal units they can be reinstalled in a different order so that after the reinstallation the seal carrier rings or seal lips are located on different paths than before. In this way the wear of the slip surface can be uniformly distributed. Wear of the slip surface can occur due to the pressure of the seal lips against the slip surface.

Depending on the water pressure and maintenance intervals to be expected, a plurality of seal units are provided. The outer seal units serve for sealing the bearing against entering seawater. First here the outermost seal unit, i.e., the seal cover, seals. When the outermost seal unit or its seal lips is worn out, that is, when it can no longer keep out seawater, the subsequent seal lips serve as the seal against entering seawater. In this way a seal system is used that includes still further backup seal lips in addition to a seal lip. In addition, seal units or seal lips can be disposed on the bearing rings in order to hold a lubricant in the bearing.

According to a further aspect a tidal turbine is disclosed including a rotor including rotor blades disposed on a rotor hub and a rotor shaft carrying the rotor, wherein a drive torque is transmissible from the rotor hub to the transmission or generator by a sealed bearing module as described above.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
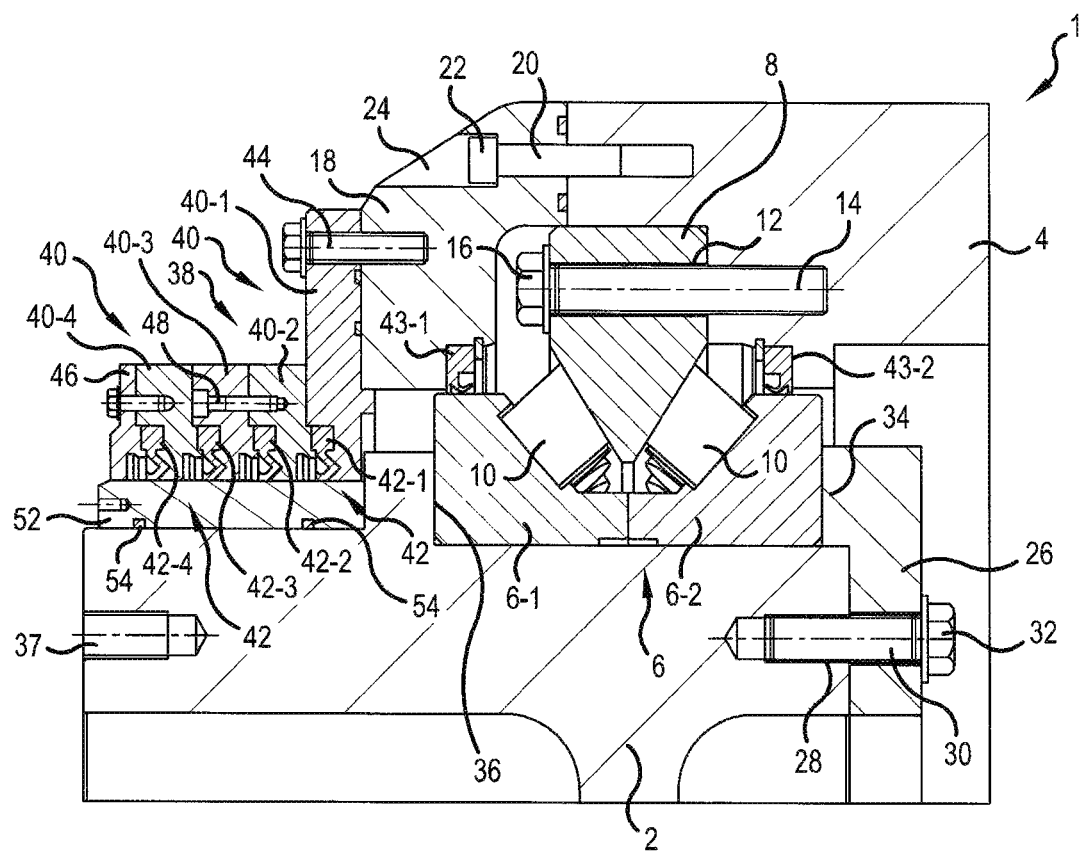
FIG. 1 is a sectional view of a sealed bearing module for a tidal turbine according to a first embodiment of the present disclosure.

FIG. 1 shows a sealed bearing module 1. The bearing module 1 serves to transmit a drive torque from a rotor hub (not shown) of a rotor of a tidal turbine to a transmission or generator (not shown) in a nacelle of the tidal turbine. Here the transmission of the drive torque is effected in the Figures shown from the left (rotor side) to the right (generator side) via a rotor shaft 2 that transmits a rotation of the rotor hub to the subsequent transmission or the generator. Here the bearing module 1 can be accommodated in particular in a housing 4 of the nacelle. Here the housing 4 protects the bearing and provides mechanical stiffness against bearing deformation.

The bearing module 1 includes an inner ring 6 and an outer ring 8, between which rolling elements 10 are disposed. In the embodiment shown the bearing module 1 is a double row tapered roller bearing in back-to-back arrangement in which the inner ring is configured as a split ring including a first ring part 6-1 and a second ring part 6-2. As a not-shown alternative embodiment the double row tapered roller bearing can also be configured in face-to-face arrangement including a split outer ring.

The outer ring 8 includes a through-bore 12, into which an attachment means is insertable in order to connect the outer ring 8 to housing 4. In the embodiment shown in FIG. 1 a threaded rod 14 is provided as attachment means in the through-bore 12, which threaded rod 14 is screwed into the housing 4 by one end. A nut 16 is screwed on the opposite end, via which nut 16 the attachment means is supported on the outer ring 8. Of course the outer ring 8 can also be connected to the housing 4 via bolts that are screwed into the housing 4.

In order to close housing 4 in the region of outer ring 8, a cover 18 is provided that is connected to the housing 4 via an attachment means and that covers the outer ring 8. As shown in FIG. 1 the attachment means can be a bolt 20 that is screwed from the cover 18 into the housing 4. The attachment means is supported on the cover 18 by a nut or a bolt head 22 that can be countersunk in a recess 24 of the cover 18.

A preload element is provided to secure and preload the split inner ring 6. In the embodiment shown in FIG. 1 the preload element is configured as clamping ring 26. This includes a through-bore 28 in order to attach the clamping ring 26 to the shaft 2. A bolt 30 is inserted into the through-bore 28 of the clamping ring 26, which bolt 30 is screwed into the rotor shaft 2 by one end. The other end of the bolt 30 is supported on the clamping ring 26 via a nut or a bolt head 32.

In order to preload the inner ring 6, the clamping ring 26 includes a force-imparting element 34 that projects over the clamping ring 26 in a direction of the inner ring and can thus exert force on the second bearing ring 6-2 in a direction parallel to the longitudinal axis of the shaft 2. In contrast the first bearing ring part 6-1 is supported on a support element 36. This support element 36 can be configured as a projection of the shaft 2 and can be generally referred to as a shaft shoulder.

The rotor shaft 2 is connected to the rotor hub via a bolt 37. In this way the drive torque can be transmitted directly from the rotor hub to the rotor shaft 2 and thus to the subsequent transmission or generator.

In order to seal the bearing module 1, the bearing module 1 includes a seal system 38. The seal system 38 includes a plurality of seal units. Each of the seal units includes a seal carrier ring 40 and a seal lip 42 disposed therein. One of the seal units is directly connected to the cover 18 of the housing 4 by a seal carrier ring 40-1. For this purpose an attachment means 44, for example, a screw, is screwed through the seal carrier ring 40-1 into the cover 18 from the side of the seal unit. This seal unit thus serves for attaching the seal system 38 to the housing 4. In this way, the entire seal system 38 can be easily removed as needed from the housing 4 and exchanged.

A seal cover 46 serves for sealing outward. A plurality of seal units including their seal carrier rings 40-2, 40-3, 40-4, etc. are disposed between this seal cover 46 and the seal unit including the seal carrier ring 40-1. Each of these seal carrier rings 40 includes a seal element 42 including a seal lip. The seal carrier rings 40 are connected to each other via attachment means 48. Here two seal carrier rings 40 are always connected to each other. Here the attachment means 48 are circumferentially offset from one another in the axial direction.

In operation the seal lips of the seal elements 42 slip against a slip surface 50. The slip surface 50 can be configured integrally with the shaft 2 or, as depicted in FIG. 1, be configured on a spacer ring 52 that is disposed on the shaft 2. In order to seal the bearing module 1, a seal can be provided between the spacer ring 52 and the shaft 2. This sealing can be realized, for example, by O-rings 54.

If one of the seal lips is worn out, the associated seal element 42 can be exchanged in a simple manner. For this purpose the seal cover 46 is first removed. Then the subsequent seal unit including its seal carrier ring 40 and the seal element 42 can be removed and exchanged as a unit.

The seal elements 42 serve as a series circuit for keeping seawater out of the bearing. Here the seal element 42-4 must withstand the highest pressure and is therefore worn out first. If the seal element 42-4 no longer withstands the pressure of the seawater, the subsequent seal element 42-3 assumes this function. Here the seal element 42-4 furthermore functions as a filter for larger impurities. In the seal system 38 a sensor (not shown), for example a moisture sensor or pressure sensor, can be disposed that can issue a signal when seawater reaches seal elements 42-3, 42-2, or 42-1. As soon as such a signal is issued, an exchange of the seal elements 42 can be initiated. In addition, seal elements 43-1, 43-2 can be provided on the bearing rings 4, 6, which seal elements 43-1, 43-2 serve to hold lubricant in the bearing.

Figure 2:
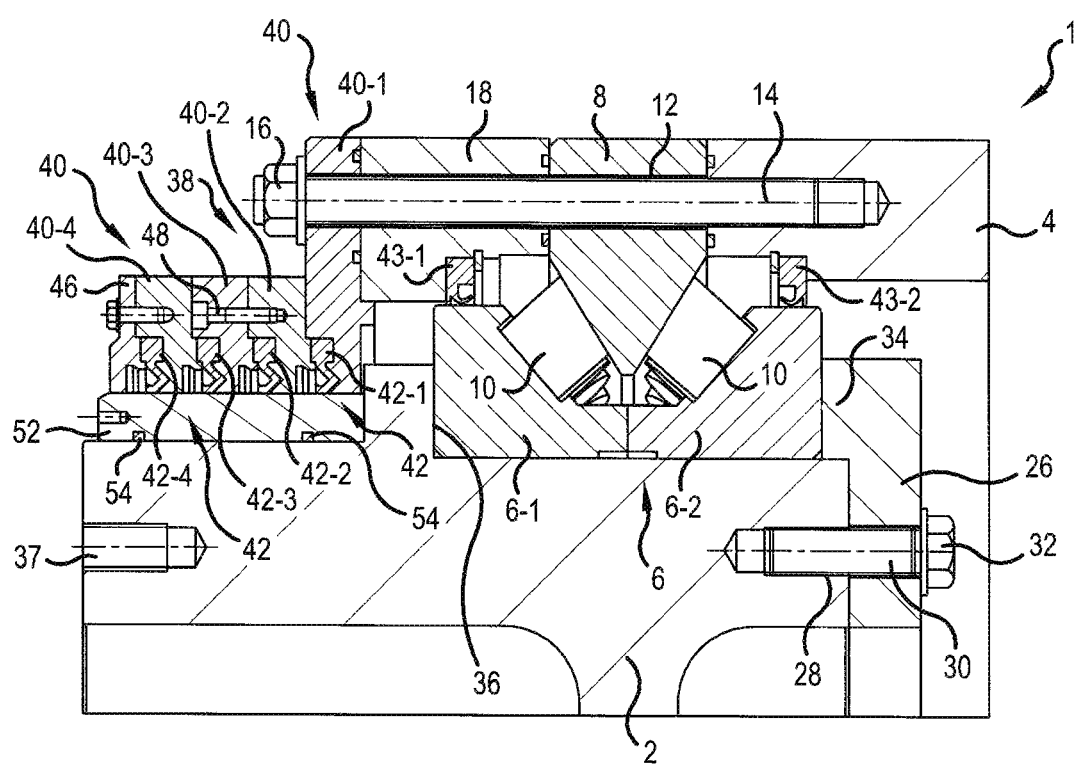
FIG. 2 is a sectional view of a sealed bearing module for a tidal turbine according to a second embodiment of the present disclosure.

FIG. 2 shows a bearing module 1 according to a second embodiment, wherein the embodiments of FIGS. 1 and 2 differ only in the attachment of the outer ring 8 to housing 4.

As in FIG. 1 the outer ring 8 includes a through-bore 12, into which an attachment means is insertable in order to connect the outer ring 8 to housing 4. In contrast to the embodiment shown in FIG. 1, in FIG. 2 a threaded rod or a bolt 14 is provided as attachment means, which threaded rod or bolt 14 is passed through the through-bore and screwed into the housing 4 by one end, and passes through the cover 18 by the opposite end and is supported on the seal carrier ring 40-1 by the nut or the bolt head 16.

A second attachment means, as is realized in FIG. 1 by the bolt 20, and the nut or the bolt head 22, can thus be omitted. Optionally the attachment means 44 from FIG. 1 can also be omitted.

In particular the bearing module 1, as shown in FIG. 2, can be installed on the housing 4 as a complete module. The individual parts, in particular the seal system 38 or the seal carrier ring 40-1, the cover 18, and the outer ring 8 can already be screwed together in advance and represent a structural unit that is preloaded and sealed. This structural unit thus represents a bearing module 1 that is ready for installation in a tidal turbine.

Figure 3:
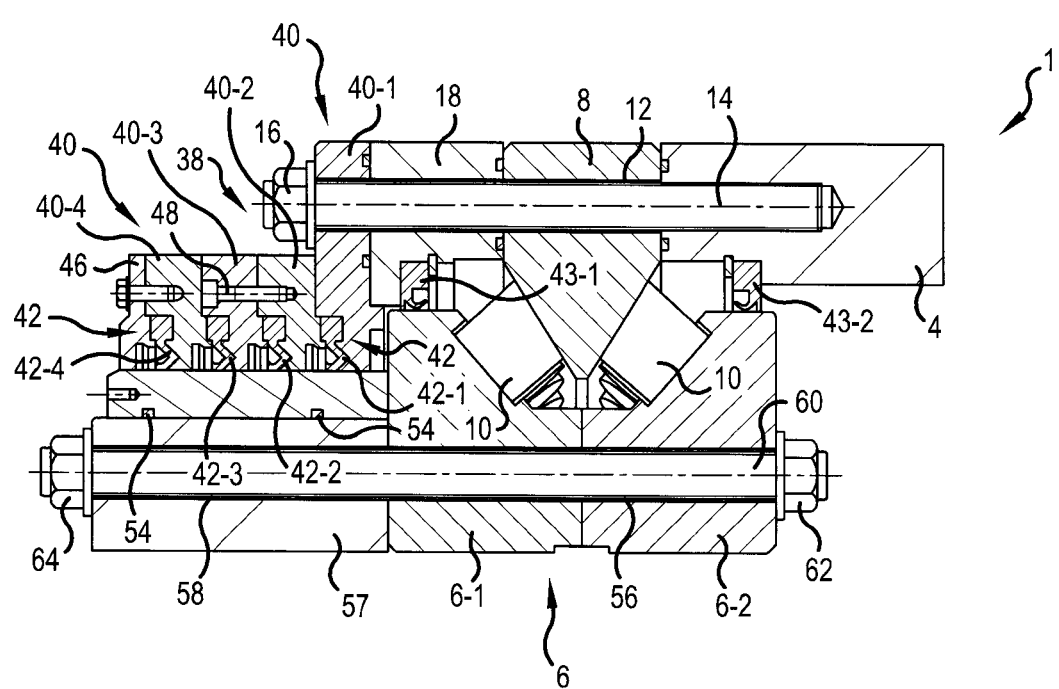
FIG. 3 is a sectional view of a sealed bearing module for a tidal turbine according to a third embodiment of the present disclosure.

FIG. 3 shows a bearing module 1 according to a third embodiment, wherein the embodiments of FIGS. 2 and 3 differ by the type of preload element of the inner ring 6 and the arrangement of the inner ring 6.

In this embodiment the inner ring 6 includes a through-bore 56. Instead of connecting the rotor hub to the generator via a rotor shaft 2, here an optional intermediate element 57 is provided that includes a through-bore 58. The through-bore 58 of the intermediate element 57 is aligned with the through-bore 56 of the inner ring 6. Here the preload element for preloading the ring parts 6-1 and 6-2 of the inner ring 6 is realized by a threaded rod or a bolt 60 that passes through the through-bores 56, 58.

The threaded rod 60 is supported on one end by a nut 62 on the second ring part 6-2. The force-imparting element 34 of FIGS. 1 and 2 is realized by the nut 62. On the opposite end the threaded rod 60 is supported on the intermediate element 57 by a nut 64. The threaded rod 60 is thus preloaded by the two nuts 62, 64, of which one can be configured as a head of a bolt. Here the inner ring 6 is supported on a stop surface of the intermediate element 57, which stop surface forms the support element 36.

In this embodiment the use of a clamping ring 26, as provided in FIGS. 1 and 2, can thus be omitted. Furthermore the transmission of the drive torque from the rotor hub to the generator is effected via the intermediate element 57 and the inner ring 6. A separate rotor shaft 2 can thus be omitted. The connecting element 60 can also be extended and thus the rotor hub is completely connected to the subsequent transmission or generator.

In summary a compact bearing assembly is provided by the disclosed sealed bearing module. In particular the length of the rotor shaft and thus the size or the weight of the nacelle can thereby be reduced. Furthermore the bearing module can already undergo necessary tests prior to installation at its destination, such as, for example, for seal-tightness, whereby the installation or maintenance complexity after installation is simplified.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide sealed bearing modules.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing module for a tidal turbine, the tidal turbine including a rotor having rotor blades disposed on a rotor hub and a rotor shaft carrying the rotor for transmitting a drive torque from the rotor hub to a transmission or generator in a nacelle, the nacelle including a housing, the bearing module comprising:
    a bearing including a first bearing ring and a second bearing ring,
    wherein:
    the first bearing ring comprises a split bearing ring including a first bearing ring part and a second bearing ring part,
    the second bearing ring has at least one axially extending bore for attaching the second bearing ring directly to the nacelle housing,
    the first bearing ring is configured to be connected to the rotor shaft and/or to the rotor hub,
    the split bearing ring is preloaded by a preload element, and
    wherein the bearing module further comprises an annular cover connected with the nacelle housing and/or the second bearing ring and disposed at least partially about the first bearing ring, a seals system located externally of the bearing and configured to keep seawater out of the bearing, the seal system including a plurality of axially-spaced, adjacent seal units attached to the cover, and at least one lubricant seal element provided on one of the cover and the first bearing ring and configured to seal against the other one of the cover and the first bearing ring so as to hold lubricant in the bearing.

2. The bearing module according to claim 1, wherein the bearing is a double row tapered roller bearing.

3. The bearing module according to claim 2, wherein the tapered roller bearing is configured in a back-to-back arrangement and the first bearing ring is an inner bearing ring.

4. The bearing module according to claim 1, wherein the first bearing ring part and the second bearing ring part each includes a through-bore through which the preload element is passable in order to preload the first and second bearing ring parts against each other.

5. The bearing module according to claim 4, wherein the preload element comprises a threaded rod.

6. The bearing module according to claim 5, wherein an intermediate element is provided between the rotor hub and the split bearing ring, wherein the threaded rod is supported by one end on the intermediate element and supported by the other end on the second bearing ring part.

7. The bearing module according to claim 1, wherein the preload element is a clamping ring including a force-imparting element configured to exert a force on the second bearing ring part, and wherein the rotor shaft includes a support element on which the first bearing ring part is supported.

8. The bearing module according to claim 7, wherein the clamping ring includes a bore configured to allow the clamping ring to be connected to the rotor shaft.

9. The bearing module according to claim 1, wherein the preload element comprises a threaded rod or a clamping ring.

10. The bearing module according to claim 1, wherein the preload element comprises a clamping ring, and wherein the bearing is a double row tapered roller bearing.

11. The bearing module according to claim 7, wherein the force-imparting element of the clamping ring is formed as an annular shoulder extending axially from a remainder of the clamping ring and having an axial end disposed against the second bearing ring part and an inner circumferential surface, the shoulder inner surface being disposed against an outer circumferential surface of the rotor shaft and slidable axially on the rotor outer circumferential surface during pre-loading of the beating rings.

12. The bearing module according to claim 1, wherein:
the seal system further includes a slip surface; and
each seal unit includes a carrier ring and a seal element disposed therein and having a seal lip disposed on the slip surface.

13. The bearing module according to claim 12, wherein the at least one lubricant seal element has a lip extending generally toward the interior of the bearing and the seal lip of each one of the seal units of the seal system extends generally away from the interior of the bearing.

14. The bearing module according to claim 12, wherein at least a portion of the carrier ring of each one of the seal units is disposed against an axially inner surface of the seal lip of the seal unit to support the seal lip against water pressure.

15. The bearing module according to claim 12, wherein the slip surface is provided on the rotor shaft or on a spacer ring disposed on the rotor shaft.

16. The bearing module according to claim 12 wherein the seal carrier rings are axially abutting and connected together such that the seal elements serve as a series circuit for keeping seawater out of the bearing.

17. A bearing module for a tidal turbine including a rotor including rotor blades disposed on a rotor huh, a rotor shaft carrying the rotor, and a nacelle including a generator and a housing, wherein a drive torque is transmitted from the rotor hub to a transmission or to the generator by the bearing module, the bearing module comprising:

a bearing including a first bearing ring and a second bearing ring, wherein:

the first hearing ring comprises a split bearing ring including a first bearing ring part and a second bearing ring part, the second bearing ring is configured to connect to the nacelle housing, the first bearing ring is configured to connect to the rotor shaft and/or to the rotor huh, and the split hearing ring is preloaded by a preload element, and the bearing module further comprises an annular cover connected with the nacelle housing and/or the second bearing ring and disposed at least partially about the first bearing ring, a seals system located externally of the bearing and configured to keep seawater out of the bearing, the seal system including a plurality of axially-spaced, adjacent seal units attached to the cover, and at least one lubricant seal element provided on one of the cover and the first herring ring and configured to seal against the other one of the cover and the first bearing ring so as to hold lubricant in the bearing.

18. The bearing module according to claim 17, wherein the preload element comprises a threaded rod.

19. The hearing module according to claim 17, wherein the preload element comprises a clamping ring.

* * * * *